United States Patent
Chang

(10) Patent No.: US 12,297,567 B2
(45) Date of Patent: May 13, 2025

(54) COMPOSITE NANO-SUBSTANCE OF COCOA-CHARCOAL CLADDED CONJUGATE STRUCTURE AND MANUFACTURING METHOD FOR YARN THEREOF

(71) Applicant: Si-Rong Chang, New Taipei (TW)

(72) Inventor: Si-Rong Chang, New Taipei (TW)

( * ) Notice: Subject to any disclaimer, the term of this patent is extended or adjusted under 35 U.S.C. 154(b) by 776 days.

(21) Appl. No.: 17/483,769

(22) Filed: Sep. 23, 2021

(65) Prior Publication Data
US 2023/0093187 A1   Mar. 23, 2023

(51) Int. Cl.
*D02G 3/04*   (2006.01)
*B82Y 30/00*   (2011.01)
*B82Y 40/00*   (2011.01)

(52) U.S. Cl.
CPC ............. *D02G 3/04* (2013.01); *B82Y 30/00* (2013.01); *B82Y 40/00* (2013.01); *D10B 2201/22* (2013.01)

(58) Field of Classification Search
CPC ............. B82Y 30/00; B82Y 40/00; D01F 1/10
See application file for complete search history.

*Primary Examiner* — Lynda Salvatore
(74) *Attorney, Agent, or Firm* — Leong C. Lei

(57) ABSTRACT

A composite nano-substance of a cocoa-charcoal cladded conjugate structure and a manufacturing method for a yarn thereof are provided. The manufacturing method includes subjecting cocoa shells to a carbonization process to form nanometer cocoa charcoal particulates; subjecting the nanometer cocoa charcoal particulates to reduction and oxidation to have a surface oxidized to form nanometer charcoal particulates containing hydroxyl groups, carboxyl groups, and epoxy groups; and further subjecting the nanometer cocoa charcoal particulate to rection through mixing with nickel chloride in glycol solution to form a composite of nanometer nickel particle reduced nanometer cocoa charcoal particulates. Further, a surfactant adding process, a polymer blending process, and a yarn drawing process may be additionally implemented to form a multipurpose textile yarn featuring ultraviolet resistance, odor resistance, strong moisture absorption, and electromagnetic wave resistance.

8 Claims, 8 Drawing Sheets

COMPOSITE NANO-SUBSTANCE OF COCOA-CHARCOAL CLADDED CONJUGATE STRUCTURE AND MANUFACTURING METHOD FOR YARN THEREOF

TECHNICAL FIELD OF THE INVENTION

The present invention relates to a composite nano-substance of a cocoa-charcoal cladded conjugate structure and a manufacturing method for a yarn thereof, and more particularly to one that subjects wastes derived from chocolate (such as cocoa shells) to high temperature carbonization to obtain a carbonized substance (which is nanometer cocoa charcoal particulates) that is further subjected to reduction and/or oxidization to make a granular structure of the nanometer cocoa charcoal particulates of which a surface carries oxygen-rich functional groups including a hydroxyl group, a carboxyl group, and an epoxy group, and finally blending the nanometer cocoa charcoal particulates with nickel chloride in a glycol solution for reaction to form a composite substance of nanometer cocoa charcoal particulates reduced by nanometer nickel particles (which is a composite nano-substance of cocoa-charcoal cladded conjugate structure), wherein the composite nano-substance possesses multiple advantages of ultraviolet resistance, odor resistance, moisture absorption, and electromagnetic wave resistance; and as such, the composite substance of nanometer cocoa charcoal particulates reduced by nanometer nickel particles can be subjected to a blending process in combination with another polymeric substance and yarn drawing to form yarns, wherein the yarns similarly possess multiple advantages of ultraviolet resistance, odor resistance, moisture absorption, and electromagnetic wave resistance.

DESCRIPTION OF THE PRIOR ART

Upgrading of living standard brings heightened requirements for fibrous clothe of people's daily living articles, particularly fibrous clothe that is used to make beddings, fibrous clothe that is used to make clothing, or fibrous clothe that is used to make daily living articles. Since the fibrous clothe that is used to make the daily living articles are frequently put in contact with human bodies, and consequently, sweat and stains inevitably attach to the surface of such articles. This leads to growth and breeding of bacteria or sticking of viruses to the articles and thus making the articles a hotbed for incubation of bacteria.

Heretofore, it has been proposed to add an antibacterial substance in the fibrous clothe, in order to achieve inhibiting breeding of bacteria and viruses on the fibrous clothe, for protecting human health.

Further, manufacturers also proposed electromagnetic wave resistant clothe. This is because electrical devices, such as electromagnetic ovens, microwave ovens, hair dryers, and mobile phones, which are commonly used in the daily living, bring electromagnetic waves that exist in the surroundings. The electromagnetic wave resistant clothe is structured, based on the operation of yarn spinning, by twisting and weaving metal fibers that are electrically conductive and magnetically permeable to form a protective textile that is electrically conductive and magnetically permeable, in order to resist electromagnetic radiation and provide a garment with an advantageous function of resisting electromagnetic waves and a health index.

However, in a known manufacturing process involving the electrically conductive and magnetically permeable metal fibers, it often needs to add ferromagnetic particles in polymers, for example polyesters, such as polyethylene terephthalate (PET), and nylon, such as polyamide (PA) 6. Adding the magnetic metal particles in the polyester or nylon would lead to an increase of overall weight of a yarn after such materials are drawn to form yarns, and also, the hardness of the yarns so formed is increased, making it opposite to the requirement for a modern textile product to be light in weight.

Further, in a modem process of chocolate production, a lot of wastes are generated, such as cocoa husks or cocoa shells. Such wastes of chocolate production are generally not reused, and become consequently a pollutant to the environment.

SUMMARY OF THE INVENTION

An objective of the present invention is to provide a composite nano-substance of a cocoa-charcoal cladded conjugate structure and a manufacturing thereof, which comprises:

(1) preparing cocoa charcoal particles: providing and subjecting cocoa shells to a carbonization process, in order to obtain cocoa charcoal particles, and then subjecting the cocoa charcoal particles to a grinding process, in order to obtain nanometer cocoa charcoal particulates.

(2) subjecting the nanometer cocoa charcoal particulates to reduction and oxidization: introducing the nanometer cocoa charcoal particulates into an acidic solution and adding a strong oxidizing agent for mixing and reacting in order to obtain a granular structure of nanometer cocoa charcoal particulates having a surface oxidized to carry oxygen-rich functional groups including a hydroxyl group, a carboxyl group, and an epoxy group.

(3) combining the nanometer cocoa charcoal particulates with nanometer nickel particles: dissolving the nanometer cocoa charcoal particulates obtained in step (2) in a glycol solution to obtain a glycol solution containing nanometer cocoa charcoal particulates, and dissolving nickel chloride in another glycol solution to obtain a glycol solution containing nickel chloride, and mixing the glycol solution containing nanometer cocoa charcoal particulates and the glycol solution containing nickel chloride for reaction to form a composite substance of nanometer cocoa charcoal particulates reduced by nanometer nickel particles (which is the composite nano-substance of cocoa-charcoal cladded conjugate structure).

As such, the manufacturing method of the composite nano-substance of cocoa-charcoal cladded conjugate structure as described above generally utilizes wastes (such as coca shells) derived from a production process of chocolate to be subjected to high temperature carbonization, and the carbonized substance so obtained (which is nanometer cocoa charcoal particulates) is further subjected to reduction and/or oxidization to form a granular structure of the nanometer cocoa charcoal particulates having a surface carrying oxygen-rich functional group including a hydroxyl groups, a carboxyl group, and an epoxy group, and finally, the nanometer cocoa charcoal particulates are mixed with nickel chloride in a glycol solution for reaction to form a composite substance of nanometer cocoa charcoal particulates reduced by nanometer nickel particles (which is a composite nano-substance of cocoa-charcoal cladded conjugate structure), wherein the composite nano-substance possesses multiple advantages of ultraviolet resistance, odor resistance, moisture absorption, and electromagnetic wave resistance. And, also, the wastes generated in a production process of chocolate can be effectively reused to prevent increase of pollutants to the environment Further, another objective of the present invention is to provide a composite nano-substance of a cocoa-charcoal cladded conjugate structure and a manufacturing method for a yarn thereof, wherein the manufacturing method includes steps (1)-(3) of the manufacturing method of the composite nano-substance of cocoa-charcoal cladded conjugate structure described above, and further includes, posterior thereto, step (4) in which the composite substance of nanometer cocoa charcoal particulates reduced by nanometer nickel particles is introduced into a solution and added with a surfactant, and step (5) in which the composite substance of nanometer cocoa charcoal particulates reduced by nanometer nickel particles and having a surface cladded or covered with the surfactant is blended with another polymeric substance and is further subjected to yarn drawing to make yarns. The yarns similarly possess multiple advantages of ultraviolet resistance, odor resistance, moisture absorption, and electromagnetic wave resistance. And, further a textile formed by weaving the yarns also possesses functions of ultraviolet resistance, odor resistance, moisture absorption, and electromagnetic wave resistance, providing a fibrous textile with a better healthy advantage and index of resistance to electromagnetic waves.

DETAILED DESCRIPTION OF THE PREFERRED EMBODIMENT

Referring first to FIGS. 1-7, the present invention discloses a composite nano-substance of a cocoa-charcoal cladded conjugate structure and a manufacturing method for a yarn thereof. Firstly, a method for manufacturing a composite nano-substance of cocoa-charcoal cladded conjugate structure comprises:

First step, preparing cocoa charcoal particles: providing and subjecting cocoa shells to a carbonization process, in order to obtain cocoa charcoal particles, and then subjecting the cocoa charcoal particles to a grinding process, in order to obtain nanometer cocoa charcoal particulates 1.

Figure 1:
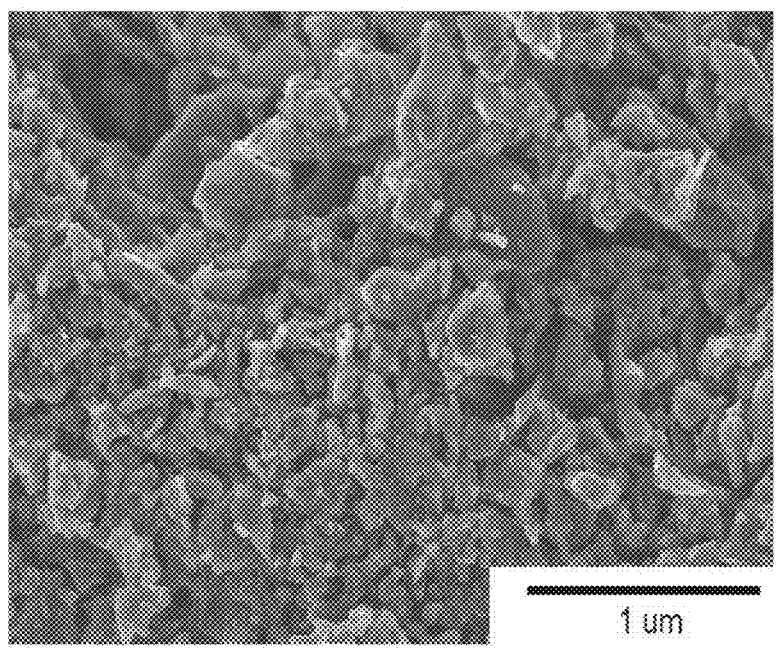
FIG. 1 is a scanning electron microscope picture illustrating carbonized cocoa charcoal particles that have been subjected to mechanical grinding and pulverization according to the present invention.
Figure 2:
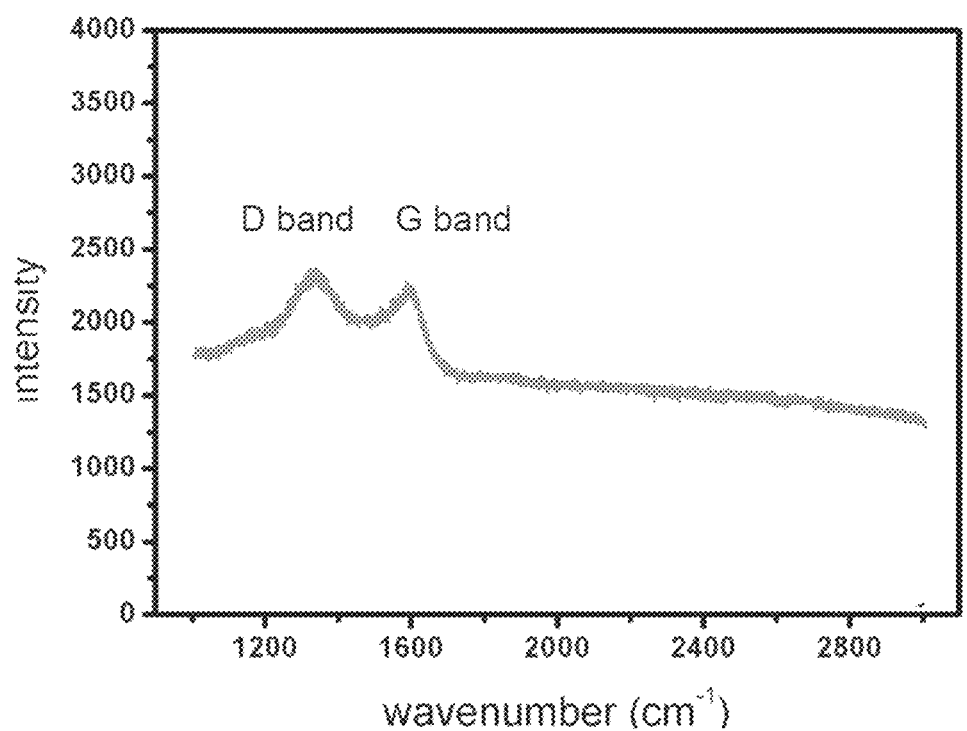
FIG. 2 is a diagram illustrating a plot of Raman spectroscopy of carbonized cocoa charcoal according to the present invention, wherein a peak value of defect vibration mode (D-band) is at 1400 $cm_{-1}$, and a peak value of stretch vibration mode (G-band) is at 1600 $cm_{-1}$.

According to the description of the first step, in an example of the present invention, the carbonization process is such that the cocoa shells are placed in a baking oven of 60° C.-90° C. for drying to ensure there is no moisture remaining; then, the dried cocoa shells are placed in a high-temperature oven, an interior of the high-temperature oven being set as a nitrogen atmosphere with a flowrate of 50-80 sccm, and temperature being increased to 800-1000° C. at a heating rate of 5-10° C./min, the temperature being kept for 1-4 hr, so that after carbonization, the cocoa charcoal particles are obtain; and then, the cocoa charcoal particles are subjected to mechanical grinding and pulverizing, and a scanning electron microscope is used to photograph the cocoa charcoal particles (as shown in FIG. 1). It is noted that the carbonized cocoa charcoal particles are electrically conductive and Raman spectroscopy may be used to inspect if there is a D-band, G-band, or other carbon signal generated. Since the cocoa shells are primarily made up of carbon, and an electrically conductive form of carbon is a form of graphite structure. A general graphite structure is inspected by means of Raman spectroscopy to see if there is a signal generated in the D-band or G-band, and (as shown in FIG. 2) Raman spectroscopy of the carbonized cocoa-charcoal particles provides, around 1400 $cm^{-1}$, a peak value of defect vibration mode (D-band) is generated; and around 1600 $cm_{-1}$, a peak value of stretch vibration mode (G-band) is generated. The smaller the ratio between D-band and G-band is (namely the value of $I_D/I_G$ being smaller), the higher degree the carbonization is, and the higher the electrical conductivity is. Further, the cocoa charcoal particles that have been subjected to the mechanical grinding can be further subjected to wet grinding by using zirconia beads to have the cocoa-charcoal particles further ground down to a size below 200 nanometers to form nanometer cocoa charcoal particulates 1.

Second step, subjecting the nanometer cocoa charcoal particulates 1 of the first step to reduction and oxidization: introducing the nanometer cocoa charcoal particulates 1 into an acidic solution and adding a strong oxidizing agent for mixing and reacting in order to obtain a granular structure of the nanometer cocoa charcoal particulates 1 of which a surface is oxidized to carry oxygen-rich functional groups, including a hydroxyl group, a carboxyl group, and an epoxy group.

Figure 3:
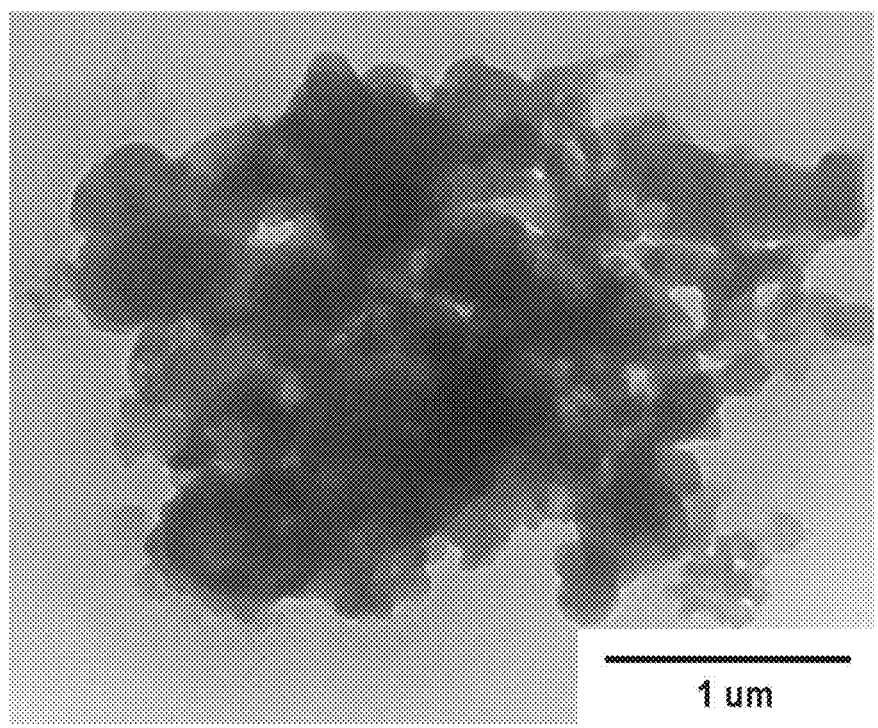
FIG. 3 is a schematic view showing nanometer cocoa charcoal being oxidized by a strong oxidizing agent to form a granular structure having a surface carrying oxygen-rich functional groups including a hydroxyl group, a carboxyl group, and an epoxy group according to the present invention.
Figure 4:
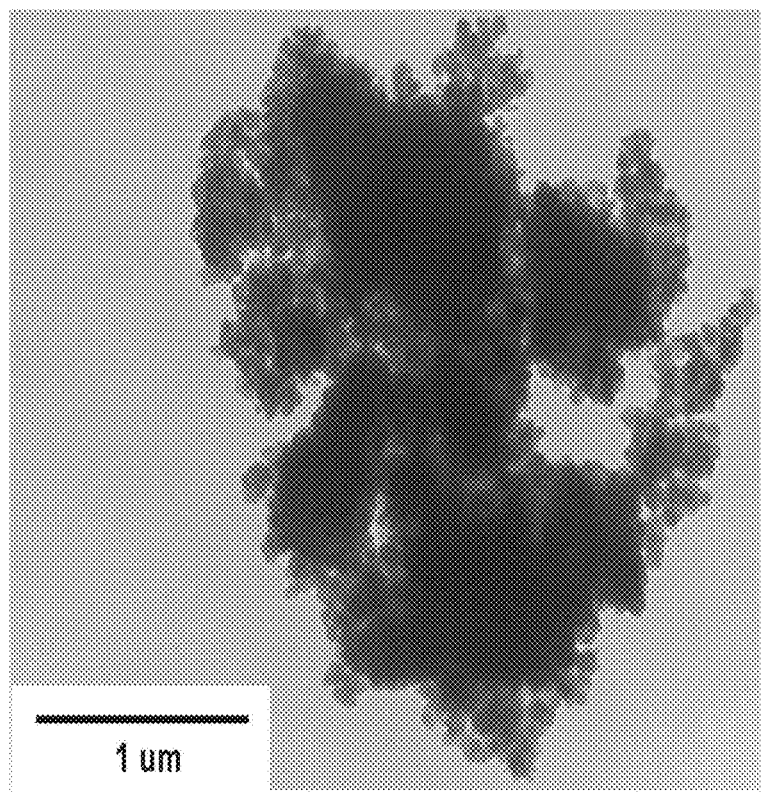
FIG. 4 is a transmission electron microscope picture illustrating nanometer nickel particles deposited on a surface of nanometer cocoa charcoal particles according to the present invention.
Figure 5:
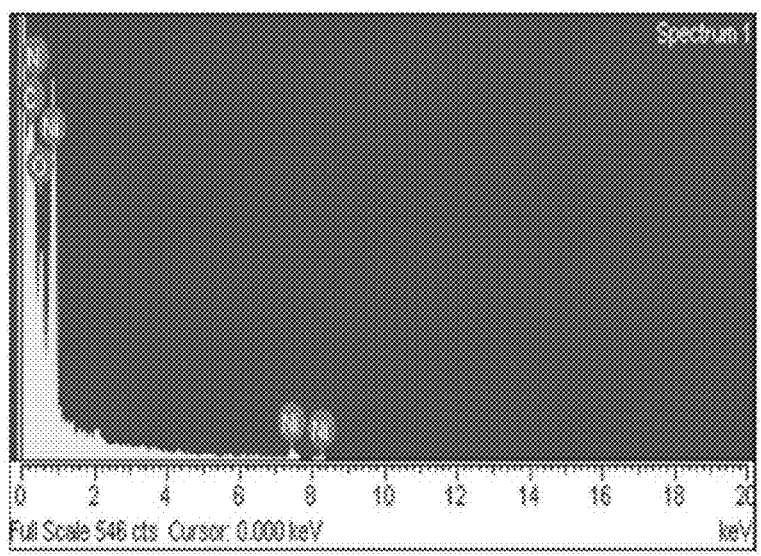
FIG. 5 is an energy dispersive x-ray spectrum of nanometer cocoa charcoal particles combined with nanometer nickel particles according to the present invention.
Figure 6:
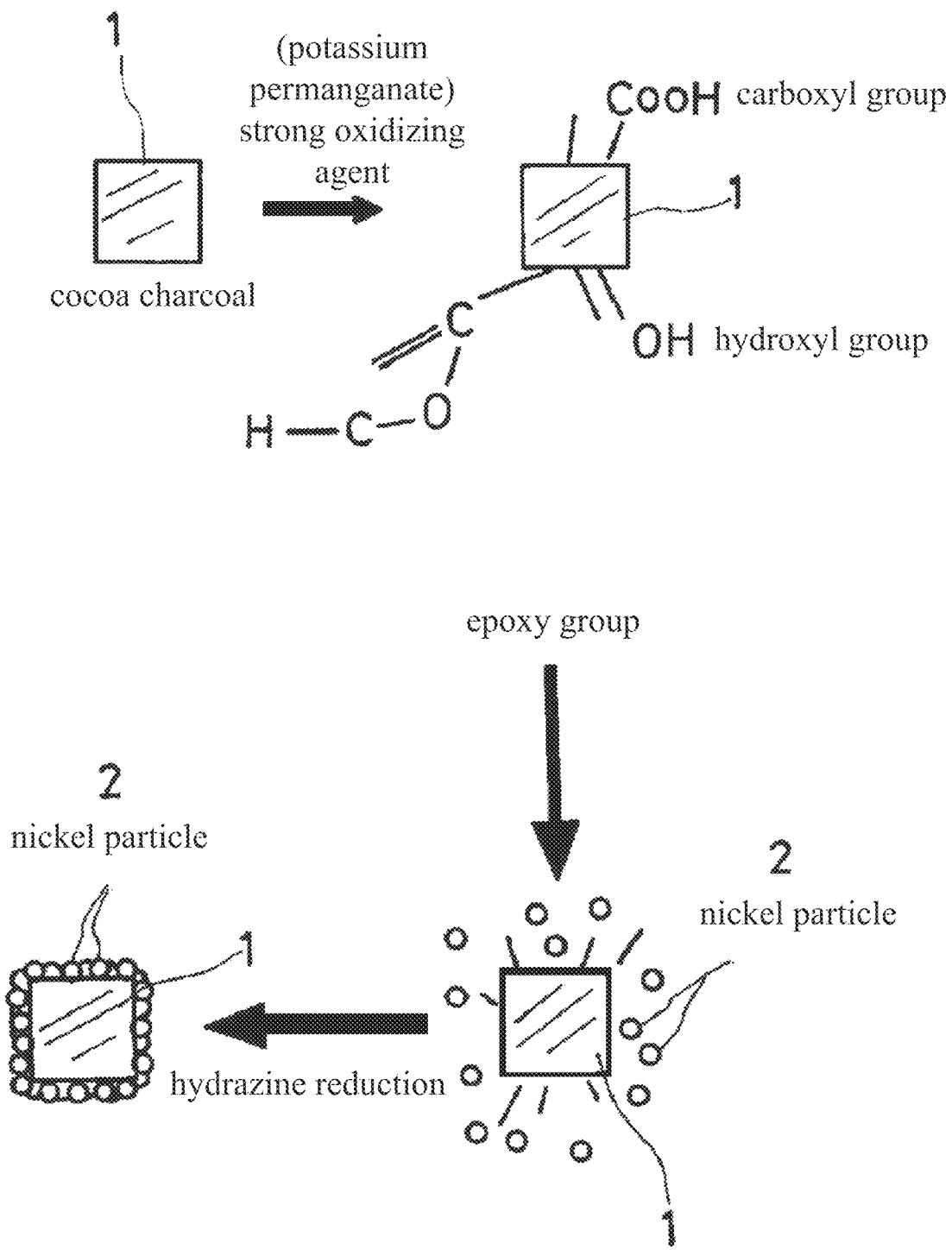
FIG. 6 is a schematic view illustrating preparation and process of having nanometer nickel particles carried on nanometer cocoa charcoal particles according to the present invention.
Figure 7:
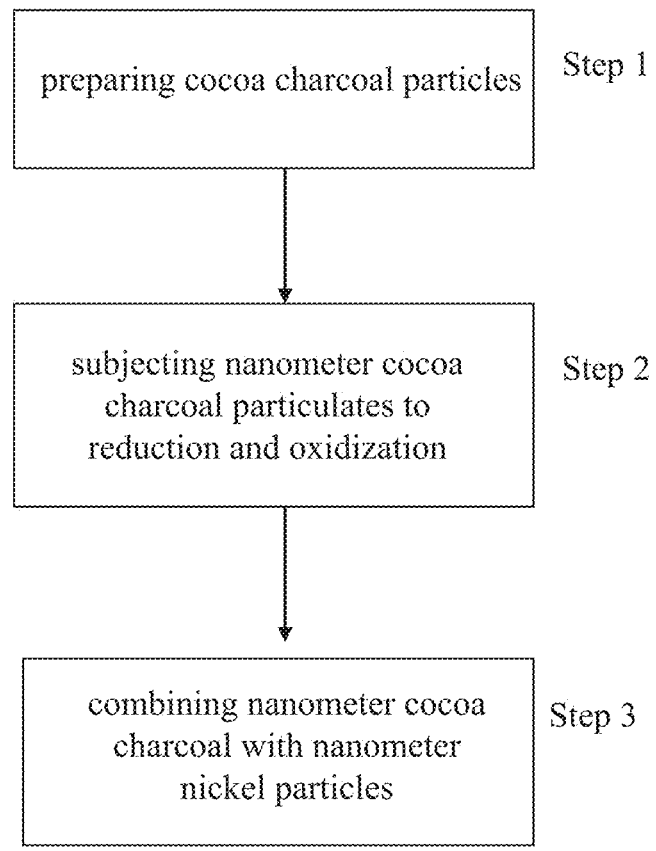
FIG. 7 is a flow chart illustrating a manufacturing method of a composite nano-substance of cocoa-charcoal cladded conjugate structure according to the present invention.
Figure 8:
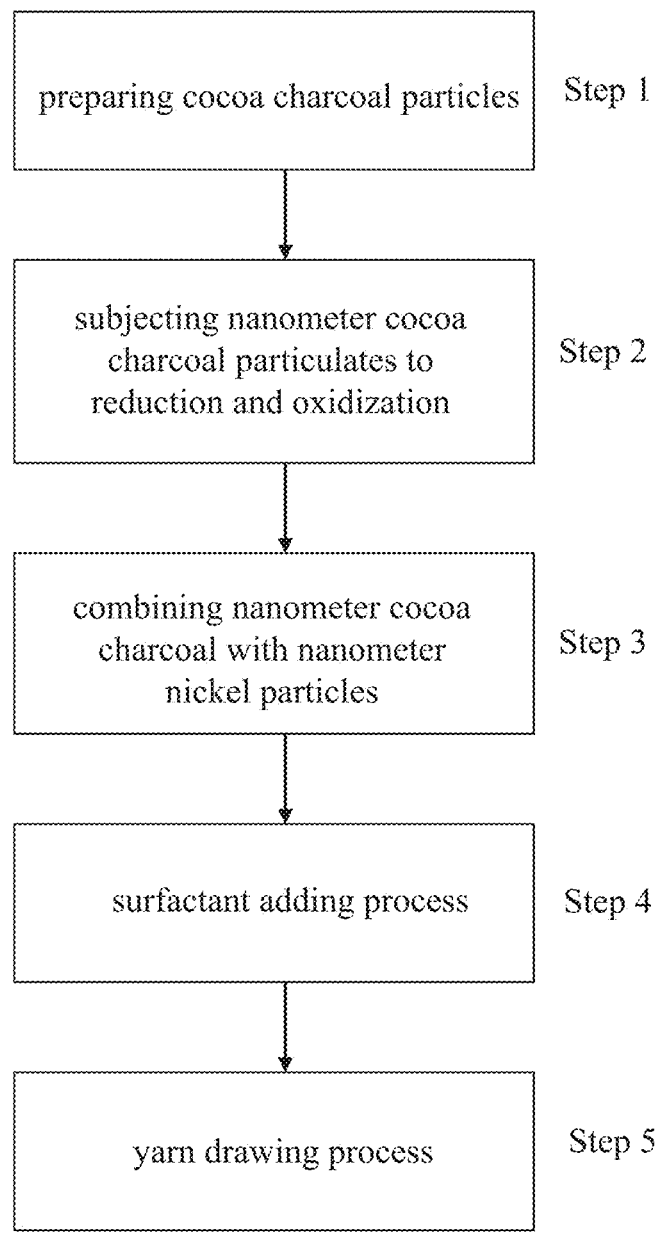
FIG. 8 is a flow chart illustrating a manufacturing method for a composite nano-substance of a cocoa-charcoal cladded conjugate structure and a yarn thereof according to the present invention.

According to the description of the second step, in an example of the present invention: the nanometer cocoa charcoal particulates of 10.5-10 g are dispersed in a sulfuric acid aqueous solution of 20-80 ml having a concentration of 2M-10M (this being the acidic solution), the sulfuric acid aqueous solution being kept, in a manner of being isolated by water, in a constant-temperature ice bath of a temperature of 5-30 degrees to ensure a reaction temperature of the sulfuric acid aqueous solution is below 25° C.; and then, sodium nitrate of 0.25-3 g and potassium permanganate of 2-10 g (this being the strong oxidizing agent) is added in the sulfuric acid aqueous solution to obtain a mixed sulfuric acid aqueous solution, while the reaction temperature is prevented from being lower than 20° C., the mixed sulfuric acid aqueous solution being necessarily stirred for 20-60 minutes to ensure uniform dispersion; after the mixed sulfuric acid aqueous solution are uniformly dispersed, the constant-temperature water bath rises to a 30-70 degree environment to allow the reaction to continue for 20-60 hours; after the reaction time, the constant-temperature water bath is heated to 70-90 degrees, and for at least three or more than three times, deionized water of 10-30 ml is added in the mixed sulfuric acid aqueous solution and stirred for 10-30 minutes, and at this moment, the mixed sulfuric acid aqueous solution rises to 80-90° C., the mixed sulfuric acid aqueous solution showing a color of dark brown; the mixed sulfuric acid aqueous solution is further added with deionized water of 100-500 ml and stirred for 1-4 hours; the mixed sulfuric acid aqueous solution is then added with hydrogen peroxide solution (having a concentration of 15-50 wt %) of 3-20 ml, and at this moment, the reaction of the mixed sulfuric acid aqueous solution stops, and at this moment, the color of the mixed sulfuric acid aqueous solution changes from the dark brown to bright brownish yellow; the mixed sulfuric acid aqueous solution is subjected to centrifugal operation at 5000-10000 rpm for 20-60 minutes and the operation is repeated, ethanol being introduced into the mixed sulfuric acid aqueous solution for washing for 2-4 times, and then a centrifugal operation at 10000-15000 rpm is performed for 20-60 minutes after which a muddy like precipitate is formed at a bottom of the mixed sulfuric acid aqueous solution, the upper part liquid being removed and the bottom muddy like precipitate (which is the granular structure of the nanometer cocoa charcoal particulates 1 of which the surface is oxidized to carry oxygen-rich functional groups, such as a hydroxyl group, a carboxyl group, and an epoxy group) is taken to complete the entire reaction. Finally, the nanometer cocoa charcoal particulates 1, which are in the muddy form, are inspected with a high resolution transmission electron microscope (HR TEM) (as shown in FIG. 3) and it is observed that the particle sizes are generally below 300 nm. The nanometer cocoa charcoal particulates 1 are subjected to oxidization by the strong oxidizing agent to form a granular structure of which the surface thereof is oxidized to carry oxygen-rich functional groups such as a hydroxyl group, a carboxyl group, and an epoxy group.

Third step, combining the nanometer cocoa charcoal particulates 1 with nanometer nickel particles: dissolving the nanometer cocoa charcoal particulates 1 that have been subjected to reduction and oxidization in the second step in a glycol solution to obtain a glycol solution that includes nanometer cocoa charcoal particulates, and then dissolving nickel chloride in another glycol solution to obtain a glycol solution that includes nickel chloride, and mixing the glycol solution that includes the nanometer cocoa charcoal particulates and the glycol solution that includes nickel chloride for reaction to form a composite substance of the nanometer cocoa charcoal particulates 1 that have been reduced by the nanometer nickel particles 2 (this being the composite nano-substance of cocoa-charcoal cladded conjugate structure).

According to the description of the third step, in an example of the present invention: the nanometer cocoa charcoal particulates 1 (2-10 mg) in a dry muddy form provided in the second step is dissolved in a glycol solution of 10-20 ml and is subjected to a ultrasonic vibration process for 40-90 minutes to obtain a glycol solution of nanometer cocoa charcoal particulates; nickel chloride ($NiCl_2$) is dissolved in another glycol solution, which has a concentration of 30-200 mM and a volume of 10-40 ml to form a glycol solution of nickel chloride, and at this moment, the glycol solution of nickel chloride shows a color of light green; the glycol solution of nanometer cocoa charcoal particulates and the glycol solution of nickel chloride are then mixed (which will be referred to as "mixed glycol solution") and are stirred at a speed of 200-600 rpm for 40-90 minutes, and at this moment, the mixed glycol solution shows a color of light yellowish brown; a sodium hydroxide aqueous solution of 2-10M is prepared and the sodium hydroxide aqueous solution is poured into the mixed glycol solution, the pouring being stopped when the pH value of the mixed glycol solution reaches 10-12; the mixed glycol solution is subjected to high-speed stirring by means of magnetic rotor, at a rotational speed of 200-800 rpm, for a time period of 400 rpm-90 minutes, and after the stirring is completed, the mixed glycol solution is moved into a constant-temperature water bath, of which a temperature is set at 40-80 degrees, and a hydrazine aqueous solution (80%) 0.50%-10 ml is prepared and added into the mixed glycol solution, and subjected to high-speed stirring by means of magnetic rotor, at a rotational speed of 2000-800 rpm for 20-80 min, rection time being 40-90 minutes; after the reaction starts, the solution changes from yellow brown color to black color, and a black substance produced in the solution is the composite material of nanometer cocoa charcoal particles that have been reduced by the nanometer nickel particles; anhydrous alcohol of 300-1000 ml is added in the mixed glycol solution and is subjected to a centrifugal operation at a speed of 5000-10000 rpm for 20-80 minutes, and the bottom black muddy like precipitate is observed, ethanol in the upper part being removed, the operation being repeated, and adding ethanol to the mixed glycol solution for washing for 2-6 times, and finally, a powerful rubidium-iron-boron magnet (such as 10000-20000 Gauss) is used separate the product (namely the composite substance of the nanometer cocoa charcoal particulates 1 having been reduced by the nanometer nickel particles 2) from the reaction solution, allowing the product (the muddy like precipitate) at the bottom of the mixed glycol solution to be retrieved and the entire reaction is thus completed; afterwards, the composite substance of the nanometer cocoa charcoal particulates 1 having been reduced by the nanometer nickel particles 2 is placed in a ceramic vessel and disposed in a baking oven of 70-80° C. for drying, and after the drying, a black powder is obtained. For the composite substance of the nanometer cocoa charcoal particulates 1 having been reduced by the nanometer nickel particles 2 so prepared, the TEM picture shown in FIG. 4 reveals that the nanometer nickel particles 2 have a particle size around 20-30 nanometers, and the nanometer nickel particles 2 that are uniformly dispersed deposit on the surface of the nanometer cocoa charcoal particulates 1. The elementary composition of the composite substance can be inspected and analyzed by using energy dispersive x-ray spectroscopy (EDX), and one can find from FIG. 5 that the cocoa charcoal particles that are treated for combination with the nanometer nickel particles 2 do contain the metal element of nickel.

As such, following the first step to the third step, wastes (such as cocoa shells) that are produced in a chocolate production process are used for high-temperature carbonization to obtain a carbonized material (namely the nanometer cocoa charcoal particulates 1), which is then subjected to reduction and/or oxidization to form a granular structure of the nanometer cocoa charcoal particulates 1 of which the surface carry oxygen-rich functional groups, such as a hydroxyl group, a carboxyl group, and an epoxy group, and finally, the nanometer cocoa charcoal particulates 1 and nickel chloride are mixed in a glycol solution for reaction to thereby complete a composite substance of the nanometer cocoa charcoal particulates 1 having been reduced by the nanometer nickel particles 2 (namely a composite nano-substance of cocoa-charcoal cladded conjugate structure), wherein the composite nano-substance possesses multiple functions of ultraviolet resistance, odor resistance, moisture absorption, and electromagnetic wave resistance; and meanwhile, the wastes produced in a chocolate production process can be effectively re-used in order to prevent increasing of environmental pollutants.

Another objective of the present invention is to provide a composite nano-substance of a cocoa-charcoal cladded conjugate structure and a manufacturing method for a yarn thereof, wherein the manufacturing method comprises:

First step, preparing cocoa-charcoal particles (of which the details are identical to those of the first step described above, and repeated description will be omitted herein).

Second step, subjecting the nanometer cocoa charcoal particulates 1 of the first step to reduction and oxidization (of which the details are identical to those of the second step described above, and repeated description will be omitted herein).

Third step, combining the nanometer cocoa charcoal particulates 1 with nanometer nickel particles 2 (of which the details are identical to those of the second step described above, and repeated description will be omitted herein).

Fourth step, a surfactant adding process: dissolving the composite substance of the nanometer cocoa charcoal particulates 1 having been reduced by the nanometer nickel particles 2 obtained in the third step in a solution (such as water) and adding therein a surfactant, so that an outer surface of the composite substance of the nanometer cocoa charcoal particulates 1 having been reduced by the nanometer nickel particles 2 is further added with the surfactant attached thereto for stabilizing the nanometer particulates, and making the nanometer particulates not combining (or aggregating) with other particles.

The surfactant can be selected as one or more than one of a cation surfactant such as cetyl trimethylammonium bromide (CTAB), sodium dodecyl sulfate (SDS), polyvinylpyrrolidone (PVP), 3-(trimethoxysilyl)propyl methacrylate, sodium hydrogen methylsulfonate (MSMA), dibenzoyl-L-tartaric acid (DBTA), 3-aminopropyltrimethoxy-silane (APTMS), and (3-mercaptopropyl)trimethoxysilane (MPTMS).

Fifth step, a yarn drawing process: blending the composite substance of the nanometer cocoa charcoal particulates 1 having been reduced by the nanometer nickel particles 2 with the surfactant attached thereto with another polymeric substance and using a plastic pellet forming apparatus to manufacture plastic pellets of the composite substance of the nanometer cocoa charcoal particulates 1 having been reduced by the nanometer nickel particles 2, and subjecting the plastic pellets to yarn drawing to form yarns of the composite nano-substance of cocoa-charcoal cladded conjugate structure.

The polymeric substance can be a plastic material, such as polyethylene terephthalate (PET), polyamide (PA6, nylon), polypropylene (PP), polyethylene (PE), acrylonitrile butadiene styrene (ABS), polycarbonate (PC), polyvinylidene difluoride (PVDF), polystyrene (PS), polyethersulfone (PES), polyvinyl chloride (PVC), and polyacrylonitrile (PAN), or other plastic polymers.

Thus, a yarn manufactured with the first to the fifth steps includes the composite substance of the nanometer cocoa charcoal particulates 1 having been reduced by the nanometer nickel particles 2. The composite nano-substance possesses multiple functions ultraviolet resistance, odor resistance, moisture absorption, and electromagnetic wave resistance, and as such, the yarn so manufactured also possesses the multiple functions of ultraviolet resistance, odor resistance, moisture absorption, and electromagnetic wave resistance. An article formed by weaving or knitting such a yarn also possesses multiple functions of ultraviolet resistance, odor resistance, moisture absorption, and electromagnetic wave resistance. This would provide a textile with an advantageous function of better resisting electromagnetic waves and a health index.

I claim:

1. A manufacturing method of a composite nano-substance of cocoa-charcoal cladded conjugate structure, the manufacturing method comprising:
   (1) preparing cocoa charcoal particles: providing and subjecting cocoa shells to a carbonization process, in order to obtain cocoa charcoal particles, and then subjecting the cocoa charcoal particles to a grinding process, in order to obtain nanometer cocoa charcoal particulates;
   (2) subjecting the nanometer cocoa charcoal particulates to reduction and oxidization: introducing the nanometer cocoa charcoal particulates into an acidic solution and adding a strong oxidizing agent for mixing and reacting in order to obtain nanometer cocoa charcoal particulates having a surface oxidized and carrying a hydroxyl group, a carboxyl group, and an epoxy group; and
   (3) combining the nanometer cocoa charcoal particulates with nanometer nickel particles: dissolving the nanometer cocoa charcoal particulates obtained in step (2) in a glycol solution to obtain a glycol solution containing nanometer cocoa charcoal particulates, and dissolving nickel chloride in another glycol solution to obtain a glycol solution containing nickel chloride, and mixing the glycol solution containing nanometer cocoa charcoal particulates and the glycol solution containing nickel chloride for reaction to form a composite substance of nanometer cocoa charcoal particulates reduced by nanometer nickel particles.

2. The manufacturing method of the composite nano-substance of cocoa-charcoal cladded conjugate structure according to claim 1, wherein the acidic solution comprises a sulfuric acid aqueous solution.

3. The manufacturing method of the composite nano-substance of cocoa-charcoal cladded conjugate structure according to claim 1, wherein the strong oxidizing agent comprises potassium permanganate.

4. A method for manufacturing a yarn with the composite nano-substance of a cocoa-charcoal cladded conjugate structure according to claim 1, the method comprising:
   (1) dissolving the composite substance of nanometer cocoa charcoal particulates reduced by nanometer nickel particles in a solution and adding therein a surfactant, so that an outer surface of the composite substance of nanometer cocoa charcoal particulates that are reduced by nanometer nickel particles is attached with the surfactant; and
   (2) blending the composite substance of nanometer cocoa charcoal particulates that are reduced by nanometer nickel particles and attached with the surfactant with another polymeric substance, and using a plastic pellet forming apparatus to manufacture plastic pellets of the composite substance of nanometer cocoa charcoal particulates that are reduced by nanometer nickel particles, and subjecting the plastic pellets to yarn drawing to form yarns of the composite nano-substance of cocoa-charcoal cladded conjugate structure.

5. The method for manufacturing a yarn the composite nano-substance of a cocoa-charcoal cladded conjugate structure according to claim 4, wherein the surfactant comprises one or more than one of cetyl trimethylammonium bromide (CTAB), sodium dodecyl sulfate (SDS), polyvinylpyrrolidone (PVP), 3-(trimethoxysilyl) propyl methacrylate, sodium hydrogen methylsulfonate (MSMA), dibenzoyl-L-tartaric acid (DBTA), 3-aminopropyltrimethoxy-silane (APTMS), and (3-mercaptopropyl) trimethoxysilane (MPTMS).

6. The method for manufacturing a yarn the composite nano-substance of a cocoa-charcoal cladded conjugate structure according to claim 4, wherein the polymeric substance comprises a plastic material, and the plastic material comprises one or more than one of polyethylene terephthalate (PET), polyamide (PA6, nylon), polypropylene (PP), polyethylene (PE), acrylonitrile butadiene styrene (ABS), polycarbonate (PC), polyvinylidene difluoride (PVDF), polystyrene (PS), polyethersulfone (PES), polyvinyl chloride (PVC), and polyacrylonitrile (PAN).

7. The method for manufacturing a yarn the composite nano-substance of a cocoa-charcoal cladded conjugate structure according to claim 4, wherein the acidic solution comprises a sulfuric acid aqueous solution.

8. The method for manufacturing a yarn the composite nano-substance of a cocoa-charcoal cladded conjugate structure according to claim 4, wherein the strong oxidizing agent comprises potassium permanganate.

* * * * *